Figure 1:
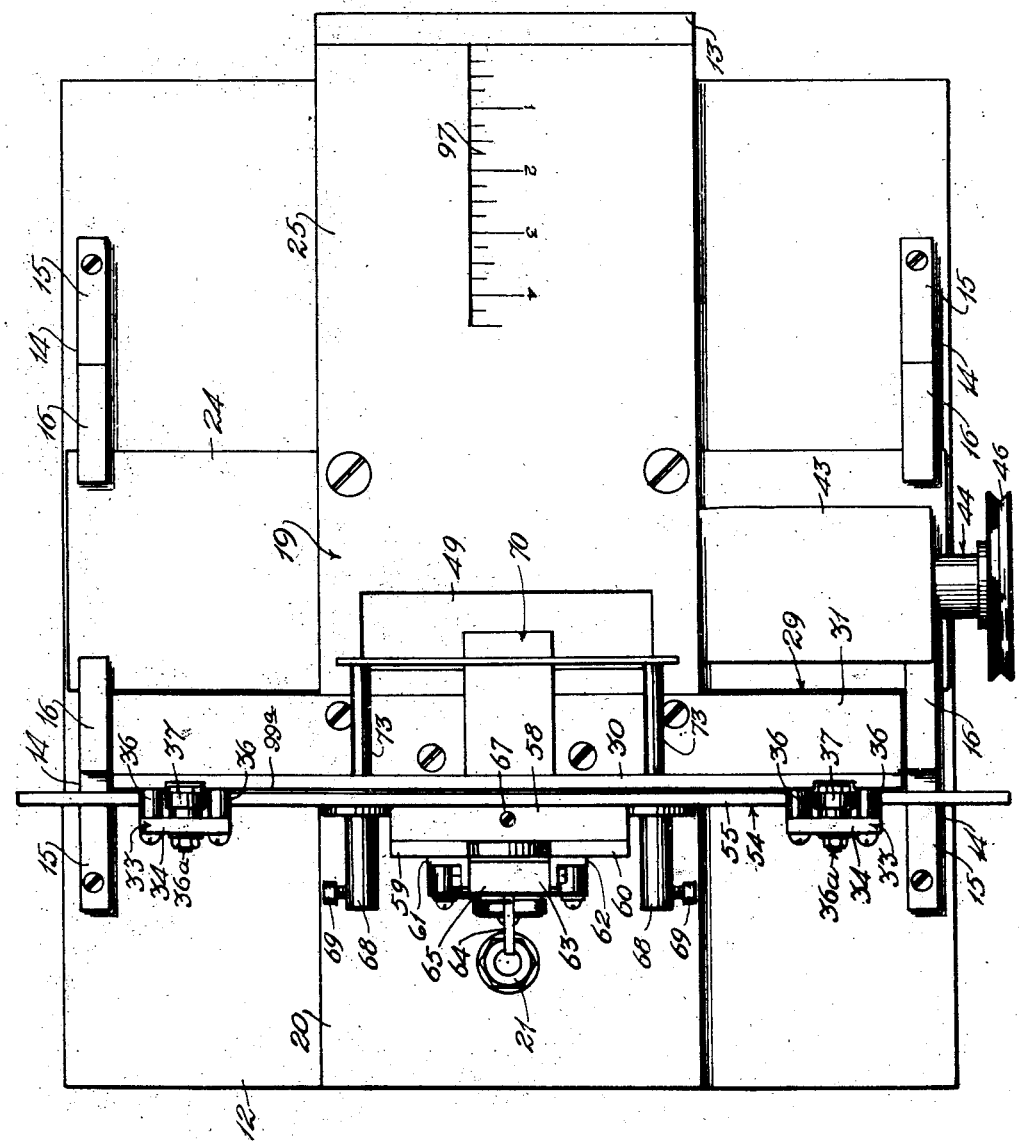

Nov. 2, 1937. H. SMITH 2,097,745
APPARATUS FOR MAKING MOVING PICTURES IN DEPTH
Filed Feb. 25, 1936 4 Sheets—Sheet 1

Inventor
Harry Smith,
By Geo. P. Kimmel
Attorney

Nov. 2, 1937.   H. SMITH   2,097,745
APPARATUS FOR MAKING MOVING PICTURES IN DEPTH
Filed Feb. 25, 1936   4 Sheets-Sheet 3

Inventor
Harry Smith,
By Geo. P. Kimmel
Attorney

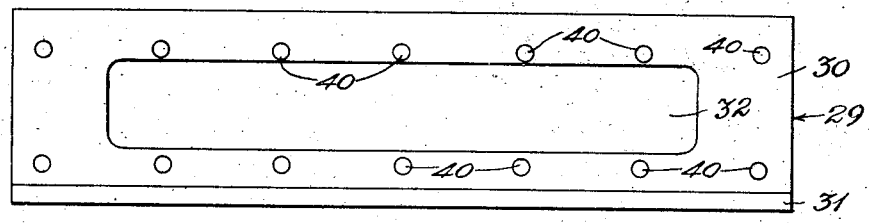
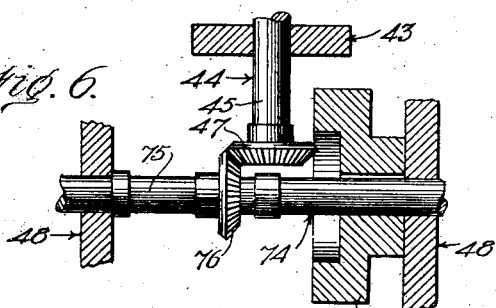
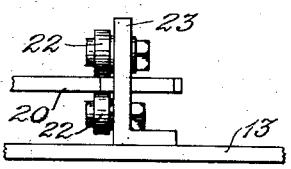
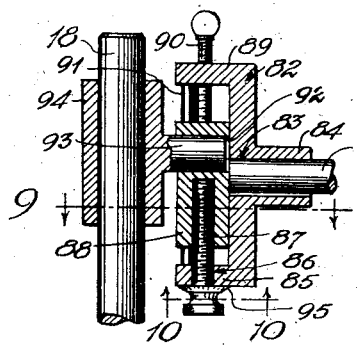
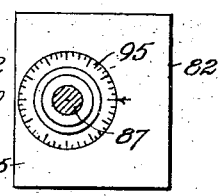
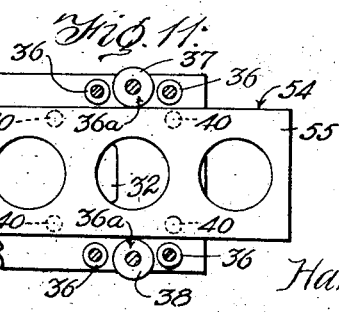

Patented Nov. 2, 1937

2,097,745

UNITED STATES PATENT OFFICE 2,097,745

APPARATUS FOR MAKING MOVING PICTURES IN DEPTH

Harry Smith, Los Angeles, Calif., assignor of one-third to John H. McCoy, and four per cent to Carmine Morrell, both of Los Angeles, Calif.

Application February 25, 1936, Serial No. 65,729

13 Claims. (Cl. 88—16.6)

This invention relates to an apparatus for making motion pictures in depth, such as pictures of the stereopticon type.

The object of the invention is to provide, in a manner as hereinafter set forth, an apparatus of the class referred to including a reciprocatory lens for producing a negative which when projected as a positive and viewed will present the scene in a condition as it was viewed in its natural form, due to the fact that the oscillatory lens provides for the recording of the scene in a manner to produce the foregoing effect.

A further object of the invention is to provide, in a manner as hereinafter set forth, an apparatus of the class referred to including a reciprocatory lens for picking up the scene to make a negative of the latter for the purpose of recording a substantially continuous panoramic view which in turn, when projected, appears as a solid picture.

A further object of the invention is to provide, in a manner as hereinafter set forth, an apparatus of the class referred to for producing a life like reproduction of a scene in depth.

A further object of the invention is to provide, in a manner as hereinafter set forth, an apparatus of the class referred to including a reciprocatory lens and with the apparatus having its generating features of a power to pick up the depths of the objects by photography and to record likewise, inasmuch as the lens never comes to rest, while the apparatus is in operation a slight elongated photographic condition is imparted to each exposure to provide for a blending effect between the exposures during the oscillation of the lens resulting in what appears to the eyes as a solid picture.

A further object of the invention is to provide, in a manner as hereinafter set forth, an apparatus of the class referred to including a reciprocatory lens carrier slidably mounted in an adjustable combined carrier guide and holder element capable of oscillating simultaneously with the reciprocating of the carrier and with said carrier and element coacting, in connection with the lens on the carrier, for picking up the depth of the objects by photography and to record likewise.

A further object of the invention is to provide, in a manner as hereinafter set forth, an apparatus for picking up the depths of objects by photography and to record likewise.

Further objects of the invention are to provide, in a manner as hereinafter set forth, an apparatus for the purpose referred to which is simple in its construction and arrangement, strong, durable, compact, conveniently operated, thoroughly efficient in its use and comparatively inexpensive to set up.

With the foregoing and other objects which may hereinafter appear, the invention consists of the novel construction, combination and arrangement of parts as will be more specifically described and as are illustrated in the accompanying drawings wherein is shown an embodiment of the invention, but it is to be understood that changes, variations and modifications may be resorted to which fall within the scope of the invention as claimed.

Figure 2:
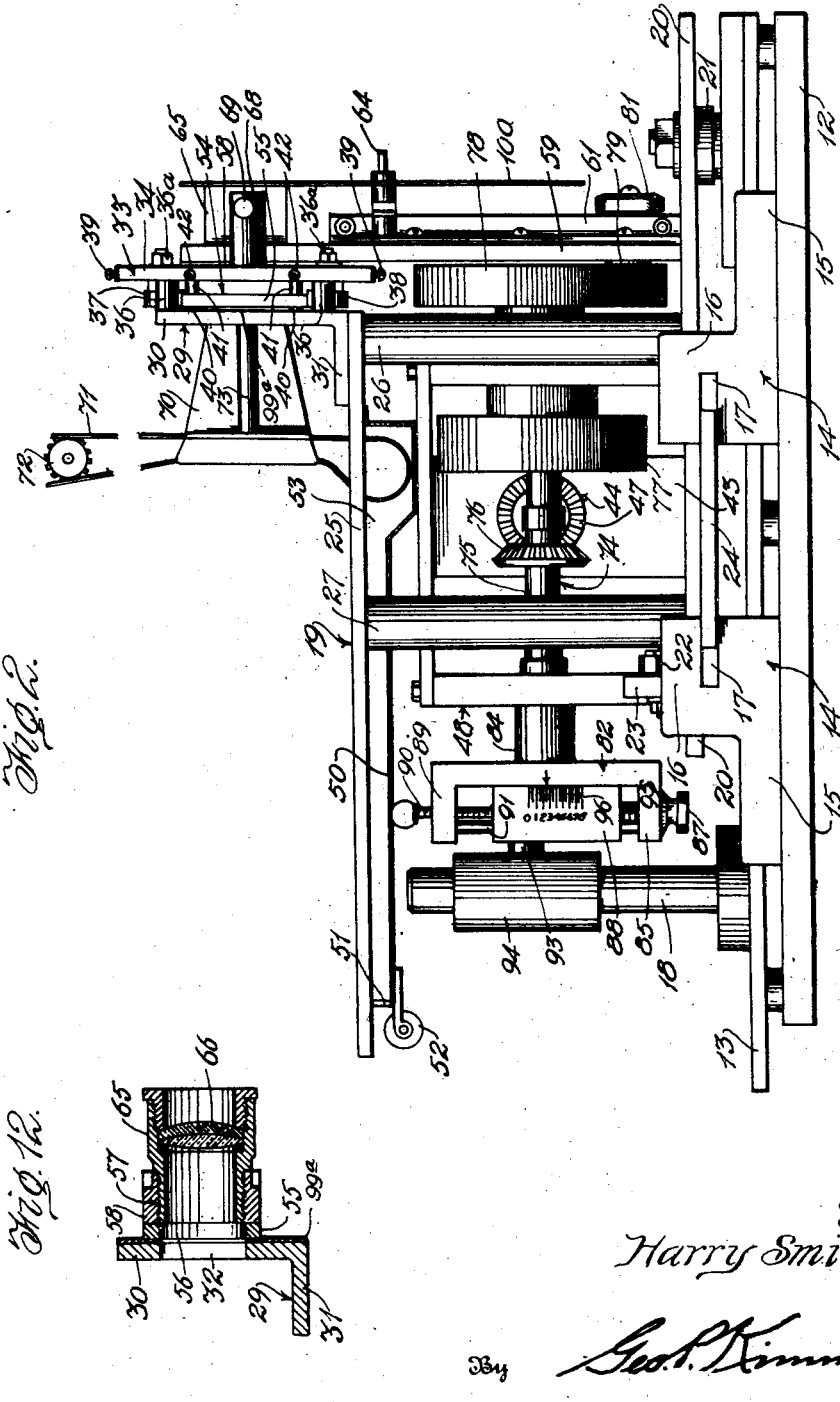
Figure 3:
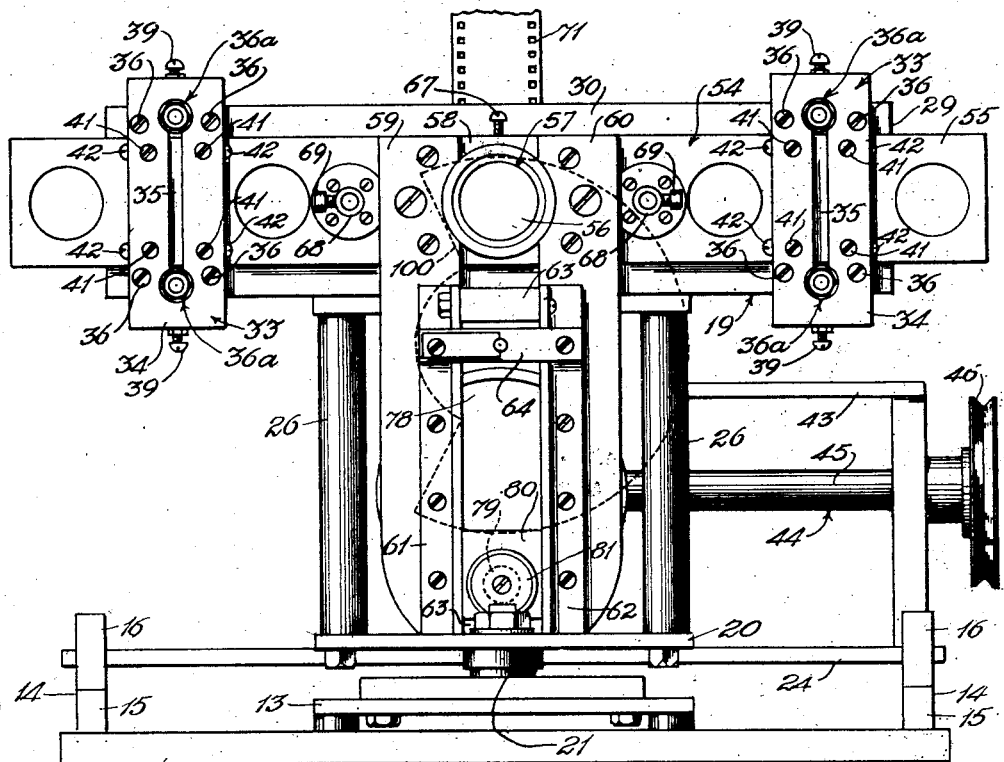
Figure 4:
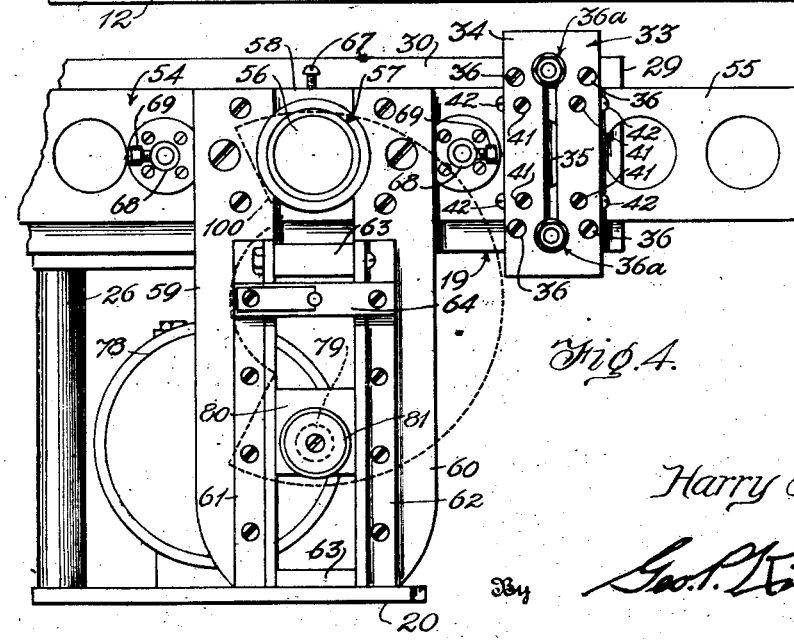

In the drawings:

Figure 1 is a top plan view,
Figure 2 is a side elevation,
Figure 3 is a front elevation,
Figure 4 is a fragmentary view in front elevation illustrating the lens carrier in shifted position to the left for taking the left view of the scene,
Figure 5 is an elevation of the top bar of the combined carrier guide and holder structure or element,
Figure 6 is a fragmentary view of the driving means partly in horizontal section,
Figure 7 is a detail view of the anti-friction rollers for the combined carrier guide and holder structure,
Figure 8 is a detail longitudinal section of the micro-angle gage or control unit,
Figure 9 is a section on line 9—9, Figure 8,
Figure 10 is an enlarged detail section on line 10—10, Figure 8,
Figure 11 is a fragmentary view in front elevation illustrating the anti-friction rollers for the lens carrier, and
Figure 12 is a fragmentary view in vertical section.

The apparatus includes a stationary base 12 provided with a super-structure 13 of slightly greater length but of materially less width than that of base 12. The super-structure 13 has its side edges spaced equi-distant from the side edges of the base 12. The base 12 is to be mounted on any suitable support. Anchored to the base 12, adjacent each side edge thereof, is a pair of oppositely spaced parallel upstanding combined guides, supports and coupling elements 14 of like form, and each of which consists of an angle-shaped plate formed of a horizontal leg 15 and a vertical leg 16 of less length than that of and merging at its bottom into the top edge of leg 15. The inner edges of the legs 15, 16 are flush with each other. The leg 15 is formed with a transverse notch 17 opening at the inner edge of the leg. The notch 17 forms a guide passage. The bottom wall of the notch functions as a support. The top and bottom walls of the notch are for a purpose to be referred to. The notch further functions as a coupler. Anchored to the rear portion of the superstructure 13 is a vertically disposed rigid post 18 of the desired height.

The apparatus includes a combined lens carrier guide and holder structure or element 19 capable of being oscillated and adjusted by means to be referred to. The structure 19 consists of a base plate 20 which is arranged over, spaced from and is of less length than that of the super-structure 13. The base plate 20, in proximity to its outer end, is pivotally connected, as at 21, to the super-structure 13 and at its rear end is supported between anti-friction rollers 22 adjustably carried by upstanding brackets 23 fixed to the super-structure 13. Fixedly secured to the lower face of the plate 20, disposed transversely with respect to and extending from each side thereof, is a combined stabilizer and coupler in the form of a rectangular plate 24 which extends through the notches 17 and couples the structure 19 to the elements 14 which, in turn, couple the structure 19 to the base 12. The guide passages formed by the notches 17 are for the plate 24. The stops provided by the top and bottom walls of the notches 17 act to prevent the vertical movement of the plate 24 relative to the elements 14. The plate 24 is capable of shifting in the notches 17, as on the oscillation of the structure 19 a gyrating movement will be imparted to plate 24.

The structure 19 includes a top plate 25 which has its outer end arranged inwardly of the outer end of plate 20. The plate 25 extends rearwardly with respect to the inner end of plate 20 and has its rear portion arranged over post 18 in spaced relation. The outer end of plate 25 is connected to plate 20, intermediate the ends of the latter, by a pair of spaced parallel vertical posts 26. The plate 25, intermediate its ends, is connected to the rear portion of plate 20 by a pair of spaced parallel vertical posts 27 which align with the posts 26.

The structure 19 includes an upstanding angle-shaped top bar or member 29 formed of a vertical leg 30 and a horizontal leg 31 extending rearwardly from the lower end of the leg 30. The leg 31 is anchored to the upper face of top plate 25. The outer face of leg 31 is flush with the outer end edge of plate 25. The leg 30 is formed with a slot 32 extending lengthwise thereof to provide a clearance for a purpose to be referred to. Positioned in proximity to each end of and at the front of leg 30 is an adjustable bearing structure 33. The bearing structures 33 are of like form and coact with the leg 30 to provide aligning guide passages for a lens carrier to be referred to. Each bearing structure 33 includes a rectangular vertically disposed plate 34 formed at its lengthwise center with an elongated slot 35. The plates 34 are anchored to the front of member 29 by the upper and lower pairs of spaced combined holdfast and spacing means 36. The plates 34 extend above and depend below the leg 30. Each plate has adjustably connected thereto an upper and a lower bearing means 36ª in the form of anti-friction rollers 37, 38. The anti-friction roller of a bearing structure 23 is arranged between a pair of the combined holdfast and spacing means 36. The upper and lower anti-friction rollers 37, 38 further act as confiners for a lens carrier to be presently referred to and are slidably mounted in a slot 35 for adjustment. The plates 34 are provided with adjusting screws 39 for adjusting the anti-friction rollers. The leg 30 of member 29 has fixedly secured thereto forwardly extending spaced bronze wearing pieces 40 throughout the top and bottom thereof. The plates 34 are provided with upper and lower rearwardly extending pairs of spaced bronze adjustable wearing pieces 41 locked in adjusted position by the screws 42. The adjustable anti-friction rollers, in connection with the wearing pieces 40, 41, take all play in every direction of the lens carrier relative to the structure 19, but at the same time permitting of the lens carrier to work freely.

The structure or element 19 includes an upstanding combined bearing and support 43 for a rotatable drive mechanism 44 operated from a prime mover, not shown. The combined bearing and support 43 is of inverted U-shape, has its inner side connected to or is integral with one side of plate 20 between a post 26 and a post 27 and extends laterally from plate 20. The outer side of the combined bearing and support 43 is connected to or is integral with one end of plate 24. The mechanism 44 consists of a shaft 45 carrying on its outer end a drive pulley 46 and on its inner end a bevel gear 47 which is spaced inwardly from the inner side of the combined bearing and support 43. The structure or element 19 also includes an upstanding inverted U-shaped combined bearing and support 48 for an operating mechanism to be referred to and which is disposed lengthwise of and connected to or integral with the plate 20. The combined bearing and support 48 is arranged rearwardly of the forward posts 26 and extends between and rearwardly from the rear posts and is disposed at right angles to the other combined bearing and support 43. The plate 25, rearwardly of the leg 31 of the member 29, is provided with a transversely extending rectangular slot 49 for a purpose to be referred to. Secured to the lower face of the plate 25 is a light shield 50 of a form provided with a removable closure 51 at its rear end. The shield 50, at its rear end, carries a guide roll 52. The shield 50, during the operation of projecting, constitutes a chute or guide passage 53 for the film. When making the picture the cover 51 is mounted in closure position.

The apparatus includes a reciprocatory lens carrier 54 consisting of an elongated narrow plate 55 which constitutes a slide and is mounted between the bearings 36ª and extends through the guide passages formed between the plates 34 and the member 29, that is to say, the leg 30 of the member 29. The plate 55, centrally thereof, is formed with an opening 56. Secured to the front of the plate 55 and formed centrally thereof with an opening 57 is a block 58. The opening 57 registers with the opening 56. The wall of the opening 57 is threaded. The block 58 is reduced at each side of its front and anchored to said reduced portions are depending legs 59, 60 which extend in close proximity to the upper face of the plate 20. Secured to the outer faces of the legs 59, 60 is a pair of oppositely disposed angle-shaped members 61, 62 which have their upper ends arranged below and spaced from the opening 57. Arranged between the members 61, 62, at the upper and lower ends thereof, are spacing members 63. The members 61 and 62 provide a track for a purpose to be referred to. Secured to and extending outwardly from the members 61, 62, near their upper ends, is a shutter bearing 64. Mounted in the openings 56, 57 is a lens housing 65 carrying a lens 66. Carried by the block 58 is a lock screw 67 which coacts with the housing 65 to secure the lens therein. Fixedly secured to the slide 55, at each side of the block 58, is an outwardly directed tubular member 68 carrying a lock screw 69. The tubular members constitute supports for a combined film guide, apertured plate and film gate element 70 which is of known form and, as is well known, it includes a plate having an aperture of the known dimensions for exposure of the film. The element 70, as is also well known, includes a guide passage for the downward travel of the film and a guide passage spaced from the other passage for the upward travel of the film. The element 70, as is also well known, includes resilient means to offset the inertia of the film during its intermittent movement. The element 70 also includes a gate for positioning the film to permit of coupling the film to the element 70 after the film is threaded through the return guide passage. The film, which is indicated at 71, is fed by a sprocket wheel 72 of the well known feed device for the film. The opening referred to as being a part of the element 70, aligns with the openings 56, 57. The element 70 includes a pair of forwardly extending bars 73 which are adjustably mounted in the tubular members 68 whereby the element 70 can be focused relative to the slide 55. The bars 73 are detachably secured in their adjusted positions by the lock screws 69. The operating mechanism of the apparatus is generally indicated at 74 and includes a shaft 75 provided with a beveled gear 76 which meshes with and is driven from the gear 47. Carried by the shaft 75, forwardly of the gear 76, is a balance wheel 77. The shaft 75 is journaled in the combined bearing and support 48 and extends forwardly and rearwardly therefrom. The shaft 75, forwardly of the balance wheel 77, carries a driving disk 78 for the lens carrier 54. The disk 78 is provided with an eccentrically disposed stud 79, upon which is loosely mounted a slide 80 which travels in the track formed by the legs 61, 62 for the purpose of reciprocating the lens carrier within the structure 19. The slide 80 is confined on the stud 79 by the retaining means 81 having threaded engagement with the stud.

The rear end of shaft 75 carries a yoke-shaped member 82 formed with an opening 83 and a hub 84. The opening 83 and hub 84 provide for the mounting of the member 82 on shaft 75. The member 82 is rigidly fixed to the shaft 75. The side 85 of member 82 is formed with an opening 86 through which passes a micrometer screw 87 having threaded engagement with a slide bearing 88. The other side 89 of the member 82 has extending therethrough a lock screw 90 adapted to abut one end of the slide 88. The sides 85, 89 of the member 82 have fixed thereto guide rails 91 for the slide bearing 88. The latter is formed with an opening 92 into which extends a stud 93 fixed to a sleeve 94 slidably mounted on the post 18 and capable of a vertical and a horizontal movement. The stud 93 also constitutes a support for the shaft 75 and upon which the member 82 revolves. The member 82 and the parts thereof constitute a micrometer angle gage for the purpose of angularly shifting the operating mechanism 74 which in turn will angularly adjust the supporting structure 19 to provide for the oscillating of the latter when the operating mechanism is active and when the latter will impart a reciprocatory motion to the lens carrier simultaneously with the oscillating of the structure 19. The member 82 is provided with suitable graduations, as indicated at 95 and 96. The graduations 97 upon plate 25 are for focal determinations.

A suitable bellows, not shown, encloses the apparatus and acts as a light shield.

Secured to the forward face of the leg 30 of the member 29 is a strip of felt 99ᵃ which constitutes a light trap.

Mounted on the shutter bearing is a shutter mechanism 100 of any suitable type and its operating means is such as to be in perfect time with respect to the other elements in the machine. The shutter construction and operating means is of known form. The operating means for the shutter is such that will permit of the shutter being bodily carried with the lens slide and its connection may be in the form of the ordinary flexible shaft.

The operation of the lens carrier is such that it provides for the lens picking up the scene to make a negative of the latter for the purpose of recording a substantially continuous panoramic view which in turn, when projected, appears as a solid picture.

The operation of the lens, in the manner as referred to, produces a life like reproduction of a scene in depth.

The apparatus provides for picking up the depth of objects by photography and to record likewise, due to the reciprocation of the lens and inasmuch as the lens never comes to rest, while the apparatus is in operation, a slight elongated photographic condition is imparted to each exposure to provide for a blending effect between the exposures during oscillation of the lens resulting in what appears to the eyes, when the positive is projected, as a solid picture.

The operating mechanism 74 operates the lens carrier in a distance equal to the average space between the human eyes. The rotating of the driving disk 78 causes the lens carrier to move to five equi-distance positions during its cycle of travel. This cycle is accomplished in one-eighth of a second and there are five pictures taken in that period and all five pictures are presented to the eyes within the range of persistency of vision causing the entire field of vision to be presented to the eyes. The micrometer angle control 82 works in perfect relation with the lens slide keeping the lens in conjunction with the subjects at all times during the cycle of travel. It is not necessary for the lens to come to rest at any time during the photographic exposure. As the lens slides from position to position the angle of inward tilt is established by the fact that the structure 19, operating mechanism, drive mechanism and lens carrier bodily tilt together in unison due to the fact that structure 19 is pivoted to the base and carries the driving and operating mechanisms, the micrometer control and the lens carrier. As was before stated, the tilting of the structure 19, operating mechanism, driving mechanism and lens carrier is had due to the medium of micrometer control. Irrespective of the position of the structure 19 or the movement of such structure the lens carrier reciprocates therein. When the micrometer control is in the position marked "zero" the structure 19 is stationary, but when any eccentric movement is applied to the control unit the amount is registered in degrees or fractions thereof on said structure and the assembly mounted thereon. The element 70 carries the film during the reciprocation of the lens carrier. The film is fed downwardly at the rear of the element 70 and then upwardly through said element 70 forwardly of the stretch of the film that is being fed downwardly and the downwardly moving stretches of the film are protected against light rays to prevent any action of light on such stretches when the upwardly moving stretches are exposed. The intermittent movement of the film is accomplished by any conventional form of mechanism for such purpose.

What I claim is:

1. In an apparatus for the purpose set forth, a base structure, a holder structure arranged over said base structure including a lens carrier guide at its front, a lens carrier mounted in said guide, means for pivotally connecting said holder structure to said base structure, said structures having coacting inter-engaging means for slidably connecting the holder structure to the base structure intermediate the ends of the latter, a driving mechanism, an operating shaft journaled in said holder structure lengthwise of the latter and driven from said mechanism, said shaft and carrier having coacting inter-engaging parts for reciprocating the carrier on the operation of said shaft, a vertically and horizontally movable element mounted over the base structure and formed with a stud, an adjustable gage structure permanently encompassing and revoluble about said stud, bodily carried by said shaft and including an adjustable part providing when adjusted for bodily carrying said element therewith, to angularly position the holder structure relative to the base structure and to provide for the oscillating of the holder structure simultaneously with the reciprocation of the carrier.

2. In an apparatus for the purpose set forth, a base structure, a holder structure extending upwardly from said base structure and including a lens carrier guide at its front, means for pivotally connecting said structures together adjacent the fronts thereof, said structures having coacting means for slidably connecting the holder structure to the base structure, the said coacting means being arranged rearwardly of said pivotal connecting means, a lens carrier slidably mounted in said guide, and an operating mechanism journaled in said structure, said mechanism and carrier having coacting parts to provide for the reciprocation of said carrier on the operation of said mechanism.

3. In an apparatus for the purpose set forth, a base structure, a holder structure extending upwardly from said base structure and including a lens carrier guide at its front, means for pivotally connecting said structures together adjacent the fronts thereof, said structures having coacting means for slidably connecting the holder structure to the base structure, the said coacting means being arranged rearwardly of said pivotal connecting means, a lens carrier slidably mounted in said guide, and an operating mechanism journaled in said structure, said mechanism and carrier having coacting parts to provide for the reciprocation of said carrier on the operation of said mechanism, the said coacting parts of said carrier being in the form of a vertically disposed track forming means and the coacting part of said mechanism being formed of a slide reciprocating in said track forming means.

4. In an apparatus for the purpose set forth, a base structure, a holder structure extending upwardly from said base structure and including a lens carrier guide at its front, means for pivotally connecting said structures together adjacent the fronts thereof, said structures having coacting means for slidably connecting the holder structure to the base structure, the said coacting means being arranged rearwardly of said pivotal connecting means, a lens carrier slidably mounted in said guide, an operating mechanism journaled in said structure, said mechanism and carrier having coacting parts to provide for the reciprocation of said carrier on the operation of said mechanism, a post on the rear portion of said base structure, a revoluble and vertically movable element on said post, said operating mechanism and said element having coacting parts to provide for angularly positioning the holder structure relative to the base structure to cause the oscillating of the holder structure simultaneously with the reciprocation of the lens carrier.

5. In an apparatus for the purpose set forth, a base structure, a holder structure arranged over the base structure and including a lens carrier guide, a reciprocatory lens carrier mounted in said guide, means for pivotally connecting said structures together, said structures provided with coacting inter-engaging means intermediate their ends for slidably connecting the holder structure to the base structure, an operating mechanism for reciprocating the carrier, said mechanism journaled in said holder structure, and adjustable coacting inter-engaging means carried by the base structure and said operating mechanism and providing when adjusted for angularly positioning the holder structure relative to the base structure to cause the oscillation of the holder structure simultaneously with the reciprocation of the lens.

6. In an apparatus for the purpose set forth, a base structure, a holder structure arranged over the base structure and provided with a lens carrier guide, a horizontally disposed reciprocatory lens carrier slidably mounted in said guide, means for pivotally connecting the front end of the holder structure upon said base structure, a combined stabilizer and coupler fixed to the holder structure and slidably mounted in the sides of said base structure below said holder structure, an operating mechanism for reciprocating said carrier, said mechanism journaled in the holder structure, and coacting adjustable means supported from the base structure and said mechanism to provide when adjusted the angularly positioning of the holder structure relative to the base structure to cause the oscillating of the holder structure simultaneously with the reciprocation of a lens carrier.

7. In an apparatus for the purpose set forth, a base structure, a holder structure arranged above said base structure, means for pivotally supporting the front end of the holder structure over the front end of the base structure, said holder structure being formed at its front with a lens carrier guide, a horizontally disposed reciprocatory lens carrier slidably mounted in said guide, an operating mechanism journaled in said holder structure, said mechanism and carrier having coacting inter-engaging means to provide for the reciprocation of the carrier on the operation of said mechanism, a driving mechanism for said operating mechanism carried by said holder structure, a combined stabilizer and coupler fixed to the lower face of said holder structure and slidably engaging in the sides of said base structure intermediate the ends of the latter, a vertically and horizontally adjustable element, mounting means carried by the base structure for said element, and an adjustable gage structure bodily carried with said operating mechanism and revoluble about a part of said element and providing when adjusted to cause the holder structure to simultaneously oscillate during the reciprocation of the lens carrier.

8. In an apparatus for the purpose set forth, a base structure, a holder structure extending upwardly from the base structure and including a lens carrier guide at its front, means for pivotally supporting the front end of the holder structure upon the front end of the base structure, said base structure and holder structure having coacting, inter-engaging means slidably coupling the holder structure to the base structure intermediate the front and rear ends of the latter and rearwardly of said pivot means, a lens carrier slidably mounted in said guide, an operating mechanism journaled in said holder structure, said carrier and said mechanism having coacting, inter-engaging parts for reciprocating the carrier on the operation of said mechanism, a driving mechanism carried by the holder structure for said operating mechanism, an adjustable gage structure carried by said operating mechanism and including an adjustable part provided when adjusted to angularly adjust said holder structure on said base structure whereby said operating mechanism will provide for the oscillating of the holder structure simultaneously with the reciprocation of a lens carrier, a vertically and horizontally adjustable support provided intermediate its ends with a part extending into and upon which the adjustable part of the gage structure revolves, and a post carried by the base structure and extending through said vertically and horizontally adjustable support.

9. In an apparatus for the purpose set forth, an angularly adjustable combined lens guide and holder structure, a reciprocatory lens carrier slidably mounted in and bodily carried by said structure for disposing it at an angle corresponding to that of said structure when the latter is angularly adjusted, a driven shaft journaled lengthwise of said structure and arranged below said carrier, said shaft at one end and said carrier intermediate its ends having coacting means for reciprocating the carrier on the operation of the shaft, a micrometer angle control unit fixed to the other end of said shaft including an eccentrically adjustable slide bearing to provide when adjusted the oscillation of said structure simultaneously with the reciprocation of said carrier, a vertically and horizontally movable element including a stud extending into, bodily carried by and upon which said bearing revolves, and a mounting for said element arranged adjacent to said structure.

10. In an apparatus for the purpose set forth, an angularly adjustable combined lens guide and holder structure, a reciprocatory lens carrier slidably mounted in and bodily carried by said structure for disposing it at an angle corresponding to that of said structure when the latter is angularly adjusted, a driven shaft journaled lengthwise of said structure and arranged below said carrier, said shaft at one end and said carrier intermediate its ends having coacting means for reciprocating the carrier on the operation of the shaft, a micrometer angle control unit fixed to the other end of said shaft including an eccentrically adjustable slide bearing to provide when adjusted the oscillation of said structure simultaneously with the reciprocation of said carrier, a vertically and horizontally movable element including a stud extending into, bodily carried by and upon which said bearing revolves, a mounting for said element arranged adjacent to said structure, and a driving mechanism for said shaft mounted on and bodily carried by said structure.

11. In an apparatus for the purpose set forth, a shiftable means for a record receiving means, a horizontally disposed reciprocatory slide constituting a lens carrier arranged forwardly of portions of the record receiving means and having an opening centrally thereof to intermittently expose portions of the latter, a lens fixedly secured with the front of said carrier and aligning with said opening, means for continuously reciprocating said carrier across said receiving means whereby said lens will coact with said receiving means to have recorded on the latter a record of a substantially continuous picture, in depth, of an object and which record, when projected, will appear as a substantially solid picture in depth, a supporting structure common to the said shifting means and carrier, means for reciprocating the latter, and means coacting with the means for reciprocating the carrier to provide the oscillating of said structure simultaneously with the reciprocation of the carrier and the shifting of the record receiving means.

12. In an apparatus for the purpose set forth, an upstanding holder structure having the upper portion of its front provided with a carrier suspension, a lens carrier in the form of a slide shiftably mounted in said suspension and bodily carried with said structure, driven means journaled in said structure and eccentrically connected at its outer end with and for reciprocating said carrier in a distance substantially equal to the average space between the human eyes and to five equi-distant positions during the cycle of operation, a base structure to which the holder structure is slidably mounted and pivoted to, a vertically adjustable revolubly mounted element formed with a lateral bearing, said driven means including as a part thereof a micrometer angle control element at its rear end coacting with said element for tilting said holder structure to cause the oscillation of the latter simultaneously with the reciprocation of the carrier, and said control forming a part of said driven means including a vertically adjustable part revolubly suspended on said bearing and when adjusted carrying said element therewith.

13. In an apparatus for the purpose set forth, a shiftable means for a record receiving means, a horizontally disposed reciprocatory slide constituting a lens carrier arranged forwardly of the said record receiving means and having an opening centrally thereof to intermittently expose portions of the record receiving means, a lens fixedly secured with the front of the slide and aligning with said opening, means for continuously reciprocating said slide across said record receiving means whereby the lens will coact with the said record receiving means to have recorded on the latter a record of a substantially continuous picture, in depth, of an object in depth and which record, when projected, will appear as a substantially solid picture in depth, a supporting structure common to and bodily carrying therewith said shiftable means, said record receiving means, said slide and the means for reciprocating the slide, means coacting with the means for reciprocating the slide to provide for the oscillating of said structure simultaneously with the reciprocation of the slide, a base, means for pivotally connecting said structure to the base, and said structure and base having coacting means for slidably coupling the structure to the base.

HARRY SMITH.